United States Patent
Li et al.

(10) Patent No.: US 6,597,739 B1
(45) Date of Patent: Jul. 22, 2003

(54) THREE-DIMENSIONAL SHAPE-ADAPTIVE WAVELET TRANSFORM FOR EFFICIENT OBJECT-BASED VIDEO CODING

(75) Inventors: Shipeng Li, Princeton, NJ (US); Ya-Qin Zhang, West Windsor, NJ (US)

(73) Assignee: Microsoft Corporation, Redmond, WA (US)

( * ) Notice: Subject to any disclaimer, the term of this patent is extended or adjusted under 35 U.S.C. 154(b) by 266 days.

(21) Appl. No.: 09/597,976

(22) Filed: Jun. 20, 2000

(51) Int. Cl.[7] ................................................ H04N 7/30
(52) U.S. Cl. ................................................ 375/240.19
(58) Field of Search ................. 375/240.19; H04N 7/30

(56) References Cited

U.S. PATENT DOCUMENTS 6,215,916 B1 * 4/2001 Acharya ................ 375/240.19
6,393,060 B1 * 5/2002 Jeong .................... 375/240.19

* cited by examiner

Primary Examiner—Howard Britton
(74) Attorney, Agent, or Firm—Lee & Hayes, PLLC

(57) ABSTRACT

A three-dimensional (3D) shape-adaptive discrete wavelet transform (SA-DWT) is provided for efficient object-based video coding. In a first stage, a one-dimensional SA-DWT is performed along the temporal direction among pixels that have temporal correspondence. The correspondence can be established by motion estimation or other matching approaches. SA-DWT in the temporal direction is used to treat emerging pixels, terminating pixels or pixels that have colliding correspondence pixels. After the temporal SA-DWT transform, the resulting temporal wavelet coefficients are placed in the spatial positions corresponding to the original pixels to maintain the spatial correlation within each frame. Then, in a second stage, a two-dimensional SA-DWT is applied to the temporal SA-DWT coefficients within each frame. The 3D SA-DWT can handle arbitrarily shaped video objects while providing flexible spatial and temporal scalability as in any wavelet-based coding scheme. The 3D SA-DWT can also track the video object motion and perform the wavelet transform among corresponding pixels for that object while keeping the spatial correlation within a frame.

61 Claims, 12 Drawing Sheets

THREE-DIMENSIONAL SHAPE-ADAPTIVE WAVELET TRANSFORM FOR EFFICIENT OBJECT-BASED VIDEO CODING

TECHNICAL FIELD

This invention relates to computers, and more particularly to improved methods and arrangements for coding/decoding object data using three-dimensional (3D) shape-adaptive discrete wavelet transform (SA-DWT) techniques.

BACKGROUND

Technology is transforming the modem economy and is also having a tremendous impact on the standard of living for ordinary people. For example, video conferencing is facilitating communication and is enabling businesses to conduct business over great distances more efficiently. The Internet is also transforming the way in which both companies and people conduct business. In particular, the Internet has increased communication between people and has provided extraordinary amounts of information at one's fingertips.

Not only is technology transforming the economy, but it is also increasing the standard of living for ordinary people. For example, technology has changed the way in which people are entertained. Computer technology and video technology has enabled much more realistic and advanced video games. It has also improved the technical quality of movies and other video technology, and has made them more accessible to people.

Video processing is critical to all of these technologies. Video processing is the handling and manipulation of a video signal in order to achieve certain results including displaying an image on a monitor, compressing the signal for efficient storage or transmission, and manipulation of the image.

Recently, there has been a move away from frame-based coding towards object-based coding of image data. In object-based coding, a typical scene will include a plurality of visual objects that are definable in such a way that their associated image data (e.g., shape, motion and texture information) can be specially processed in a manner that further enhances the compression and/or subsequent rendering processes. Thus, for example, a person, a hand, or an automobile may be individually coded as an object. Note that, as used herein, objects may include any type of video displayable image, such as actual captured images, virtually generated images, text, etc.

Moving Picture Experts Group (MPEG) is the name of a family of standards used for coding audio-visual information (e.g., movies, video, music, etc.) in a digital compressed format. One advantage of MPEG compared to other video and audio coding formats is that MPEG files are much smaller for the same quality. This is because MPEG employs compression techniques to code frames, or as is the case in MPEG-4 to code objects as separate frame layers.

In MPEG there are three types of coded frame layers. The first type is an "I" or intra frame, which is a frame coded as a still image without using any past history. The second type is a "P" or Predicted frame, which is predicted from the most recent I frame or P frame. Each macroblock of data in a P frame can either come with a vector and difference discrete cosine transform (DCT) coefficients for a close match in the last I or P, or it can be "intra" coded (e.g., as in the I frames). The third type is a "B" or bi-directional frame, which is predicted from the closest two I frames or P frames, e.g., one in the past and one in the future. For example, a sequence of frames may be of the form, . . . IBBPBBPBBPB-BIBBPBBPB . . . , which contains 12 frames from I frame to I frame. Additionally, enhancement I, P, or B frame layers may be provided to add additional refinement/detail to the image. These and other features of the MPEG standard are well known.

MPEG-4 provides the capability to further define a scene as including one or more objects. Each of these objects is encoded into a corresponding elementary data bitstream using I, P, B, and enhancement frame layers. In this manner, MPEG-4 and other similarly arranged standards can be dynamically scaled up or down, as required, for example, by selectively transmitting elementary bitstreams to provide the necessary multimedia information to a client device/application.

Unfortunately, the DCT coding scheme employed in MPEG-4 provides only limited scalability with respect to both the spatial and temporal domains. In other words, the DCT coding scheme has limited capabilities for either compressing or enlarging an image and limited capabilities for making a video run faster or slower.

More recently, DCT coding schemes are being replaced with discrete Wavelet transform (DWT) coding schemes. DWT coding takes advantage of both the spatial and the frequency correlation that exist in the image data to provide even better compression of the image data.

For a two-dimensional image array (i.e., a frame layer), image data compression using DWTs usually begins by decomposing or transforming the image into four subbands or subimages. Each subimage is one-fourth the size of the original image, and contains one-fourth as many data points as the original image. The image decomposition involves first performing a one-dimensional wavelet convolution on each horizontal pixel column of the original image, thereby dividing the image into two subimages containing low frequency and high frequency information respectively. The same or a similar convolution is then applied to each vertical pixel row of each subimage, dividing each of the previously obtained subimages into two further subimages which again correspond to low and high frequency image information.

The resulting four subimages are typically referred to as LL, LH, HL, and HH subimages. The LL subimage is the one containing low frequency information from both the vertical and horizontal wavelet convolutions. The LH subimage is the one containing low frequency image information from the horizontal wavelet convolution and high frequency image information from the vertical wavelet convolution. The HL subimage is the one containing high frequency information from the horizontal wavelet convolution and low frequency image information from the vertical wavelet convolution. The HH subimage is the one containing high frequency information from both the vertical and horizontal wavelet convolutions.

The wavelet transforms described above can be performed recursively on each successively obtained LL subimage. For the practical purposes, it has generally been found that calculating four or five decomposition levels is sufficient for most situations.

To reconstruct the original image, the inverse wavelet transform is performed recursively at each decomposition level. For example, assuming a two-level compression scheme, the second decomposition level would include a subimage LL2 that is a low resolution or base representation of the original image. To obtain a higher resolution, a subimage LL1 is reconstructed by performing an inverse wavelet transform using the subimages of the second decomposition level. The original image, at the highest available resolution, can subsequently be obtained by performing the inverse transform using the subimages of the first decomposition level (but only after obtaining subimage LL1 through an inverse transform of the second decomposition level).

The attractiveness of the wavelet approach to image compression and transmission is that subimages LH, HL, and HH contain data that can be efficiently compressed to very high compression ratios through such methods as zero-tree and arithmetic encoding.

Unfortunately, current DWT techniques also suffer from certain limitations. This is especially true for object-based coding. For example, current DWT techniques require that objects, regardless of their shape, be isolated in a bounding box (e.g., a rectangle, etc.). As such, the resulting object-based coding data will include non-object information. Since encoding the non-object information is redundant, it will require additional bits to encode it. In addition, the non-object information will likely be significantly different than the object, so the correlation for pixels located in a row or column of the bounding box will likely be reduced. Consequently, the amount of object-based coding data will likely be greater. Therefore, such object-based coding DWT techniques tend to be inefficient.

While these object-based coding DWT techniques may be suitable for some specified-quality video applications, they may not be suitable for higher quality video/multimedia applications. For example, one of the potential applications for object-based coding is to allow certain objects to be selectively scaled, or otherwise selectively processed in a special manner when compared to other objects within scene. This may require coding of additional information associated with the object. This may also require providing the capability for an object to be considered not only in terms of a spatial video environment, but also in terms of a temporal video environment.

Unfortunately, conventional DCT and DWT schemes tend to lack an efficient way of handling motion and texture across a sequence of an arbitrarily shaped video object.

Thus, there is a need for improved methods and arrangements for more efficiently compressing/decompressing object-based data in a video bitstream. Preferably, the methods and arrangements will be capable of handling motion and texture across a sequence of an arbitrarily shaped video object, and provide significant compression capabilities while not restricting the coding of additional object-based information.

SUMMARY

In accordance with certain aspects of the present invention, improved methods and arrangements are provided for compressing and decompressing object-based data in a video bitstream. The methods and arrangements are capable of handling motion and texture across a sequence of an arbitrarily shaped video object. The methods and arrangements also provide significant compression capabilities while not restricting the coding of additional object-based information.

The above stated needs and others are met by various methods and arrangements that provide a three-dimensional (3D), shape-adaptive discrete wavelet transform (SA-DWT) for object-based video coding.

In accordance with certain aspects the 3D SA-DWT selectively performs a temporal SA-DWT along a temporal direction among pixels that share a temporal correspondence with respect to a sequence of frames. The temporal correspondence can be established, for example, by applying motion estimation or other like matching techniques. The resulting temporal SA-DWT is used to treat emerging pixels, continuing pixels, terminating pixels, and colliding correspondence pixels associated with one or more objects included within the sequence of frames. The objects may include images of actual physical objects, images of virtual objects, and/or a combination of the two.

Following the temporal SA-DWT, the resulting temporal SA-DWT coefficients are placed in spatial positions within arrays that correspond to the original positions of the associated pixels within each of the video frames. Subsequently, a spatial or two-dimensional (2D) SA-DWT is applied to the temporal SA-DWT coefficients within each array.

The resulting 3D SA-DWT coefficients may then be further processed, as needed, to meet the requisite compression, scalability, etc., associated with a desired use, storage and/or transportation action. A corresponding inverse 3D SA-DWT can later be performed to substantially reproduce the original video sequence.

BRIEF DESCRIPTION OF THE DRAWINGS

A more complete understanding of the various methods and arrangements of the present invention may be had by reference to the following detailed description when taken in conjunction with the accompanying drawings wherein.

DETAILED DESCRIPTION

Figure 1:
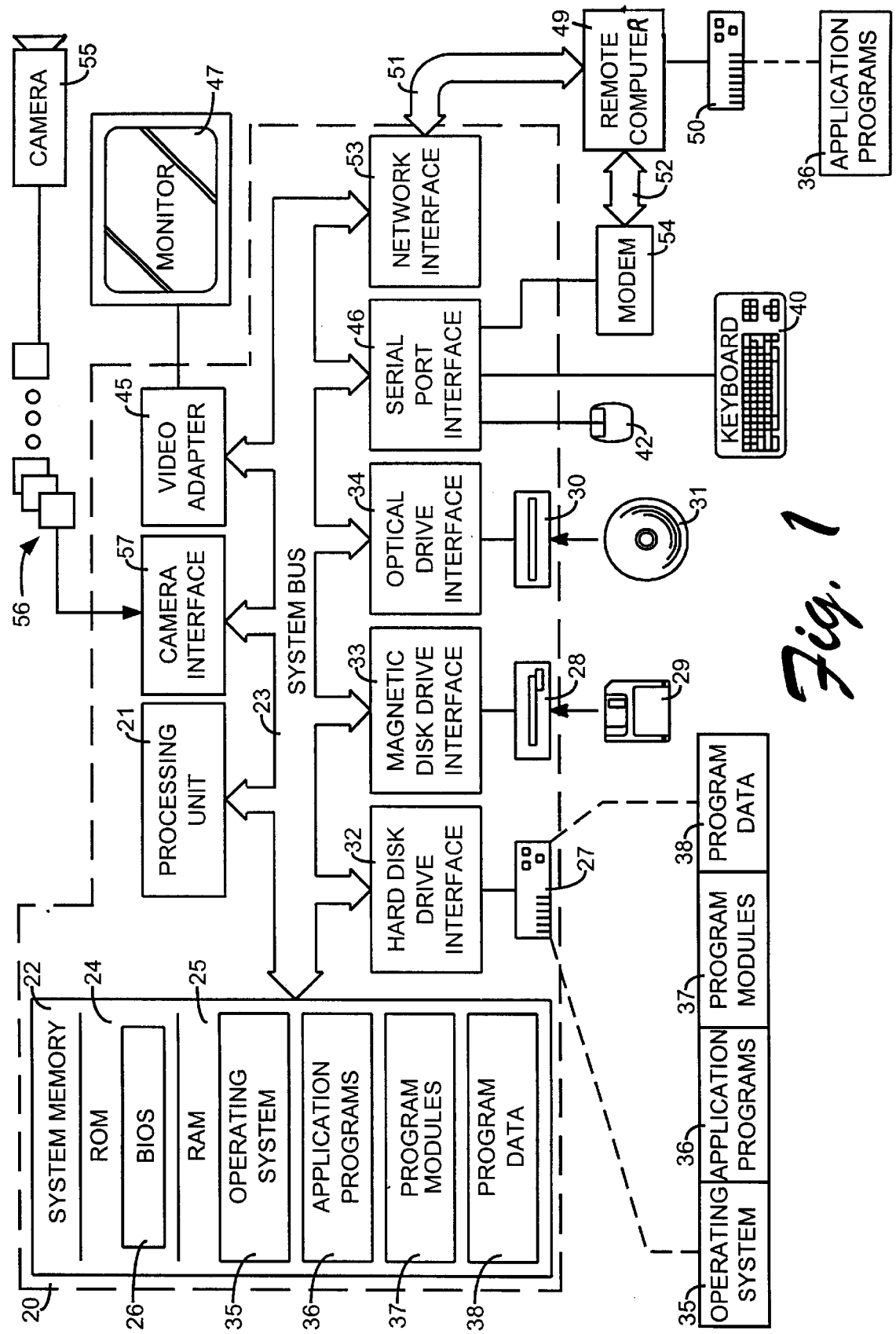
FIG. 1 is a block diagram depicting an exemplary computing environment suitable for use in processing data associated with an object-based video bitstream.

With reference to FIG. 1, an exemplary system for implementing the operations described herein includes a generalpurpose computing device in the form of a conventional personal computer 20, including a processing unit 21, a system memory 22, and a system bus 23. System bus 23 links together various system components including system memory 22 and processing unit 21. System bus 23 may be any of several types of bus structures including a memory bus or memory controller, a peripheral bus, and a local bus using any of a variety of bus architectures. System memory 22 includes read only memory (ROM) 24 and random access memory (RAM) 25. A basic input/output system 26 (BIOS), containing the basic routine that helps to transfer information between elements within the personal computer 20, such as during start-up, is stored in ROM 24.

As depicted, in this example personal computer 20 further includes a hard disk drive 27 for reading from and writing to a hard disk (not shown), a magnetic disk drive 28 for reading from or writing to a removable magnetic disk 29, and an optical disk drive 30 for reading from or writing to a removable optical disk 31 such as a CD ROM, DVD, or other like optical media. Hard disk drive 27, magnetic disk drive 28, and optical disk drive 30 are connected to the system bus 23 by a hard disk drive interface 32, a magnetic disk drive interface 33, and an optical drive interface 34, respectively. These exemplary drives and their associated computer-readable media provide nonvolatile storage of computer readable instructions, data structures, computer programs and other data for the personal computer 20.

Although the exemplary environment described herein employs a hard disk, removable magnetic disk 29 and a removable optical disk 31, it should be appreciated by those skilled in the art that other types of computer readable media which can store data that is accessible by a computer, such as magnetic cassettes, flash memory cards, digital video disks, random access memories (RAMs), read only memories (ROMs), and the like, may also be used in the exemplary operating environment.

A number of computer programs may be stored on the hard disk, magnetic disk 29, optical disk 31, ROM 24 or RAM 25, including an operating system 35, one or more application programs 36, other programs 37, and program data 38. A user may enter commands and information into the personal computer 20 through input devices such as a keyboard 40 and pointing device 42 (such as a mouse).

Of particular significance to the present invention, a camera 55 (such as a digital/electronic still or video camera, or film/photographic scanner) capable of capturing a sequence of images 56 can also be included as an input device to the personal computer 20. The images 56 are input into the computer 20 via an appropriate camera interface 57. In this example, interface 57 is connected to the system bus 23, thereby allowing the images to be routed to and stored in the RAM 25, or one of the other data storage devices associated with the computer 20. It is noted, however, that image data can be input into the computer 20 from any of the aforementioned computer-readable media as well, without requiring the use of the camera 55.

Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, a universal serial bus (USB), etc.

A monitor 47 or other type of display device is also connected to the system bus 23 via an interface, such as a video adapter 48. In addition to the monitor, personal computers typically include other peripheral output devices (not shown), such as speakers and printers.

Personal computer 20 may operate in a networked environment using logical connections to one or more remote computers, such as a remote computer 49. Remote computer 49 may be another personal computer, a server, a router, a network PC, a peer device or other common network node, and typically includes many or all of the elements described above relative to the personal computer 20.

The logical connections depicted in FIG. 1 include a local area network (LAN) 51 and a wide area network (WAN) 52. Such networking environments are commonplace in offices, enterprise-wide computer networks, Intranets and the Internet.

When used in a LAN networking environment, personal computer 20 is connected to local network 51 through a network interface or adapter 53. When used in a WAN networking environment, the personal computer 20 typically includes a modem 54 or other means for establishing communications over the wide area network 52, such as the Internet. Modem 54, which may be internal or external, is connected to system bus 23 via the serial port interface 46.

In a networked environment, computer programs depicted relative to personal computer 20, or portions thereof, may be stored in a remote memory storage device. It will be appreciated that the network connections shown are exemplary and other means of establishing a communications link between the computers may be used.

Although the exemplary operating embodiment is described in terms of operational flows in a conventional computer, one skilled in the art will realize that the present invention can be embodied in any platform or environment that processes and/or communicates video signals. Examples include both programmable and non-programmable devices such as hardware having a dedicated purpose such as video conferencing, firmware, semiconductor devices, hand-held computers, palm-sized computers, cellular telephones, and the like.

The exemplary operating environment having now been discussed, the remaining part of this description is directed towards describing various exemplary aspects and exemplary implementations of the present invention.

Figure 2:
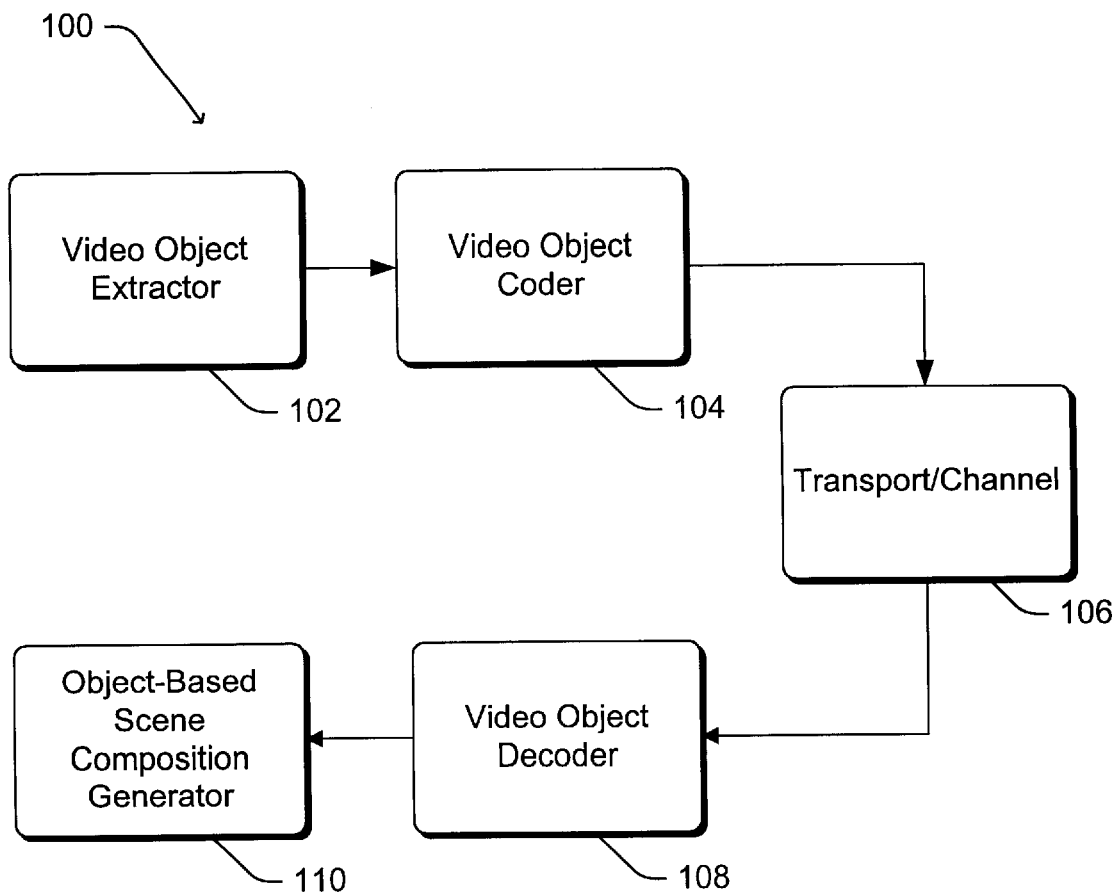
FIG. 2 is a functional block diagram depicting an exemplary arrangement for coding/decoding an object-based video bitstream.

With this in mind, FIG. 2 depicts an exemplary arrangement 100 for coding/decoding an object-based video bitstream. A video object extractor 102 is configured to extract an object from a video image. The video image may include captured images of actual scenes/objects and/or virtual scenes/objects. By way of example, video object extractor 102 may determine the boundary of an object within a scene by comparing image data within a scene. Various methods for identifying such boundaries are well known and are continually being refined.

Once an object is identified by video object extractor 102 it is provided to a video object coder 104. Video object coder 104 is configured to code and compress the video object information. Video object coder 104 generates a video object bitstream that is provided to a transport mechanism/communications channel 106. The video object bitstream is then provided to a video object decoder 108 that is configured to substantially provide the inverse functionality of video object coder 104. Thus, decoded and decompressed video object information can then be provided to an object-based scene composition generator 110 that is configured to render one or more video objects within a scene.

Figure 3:
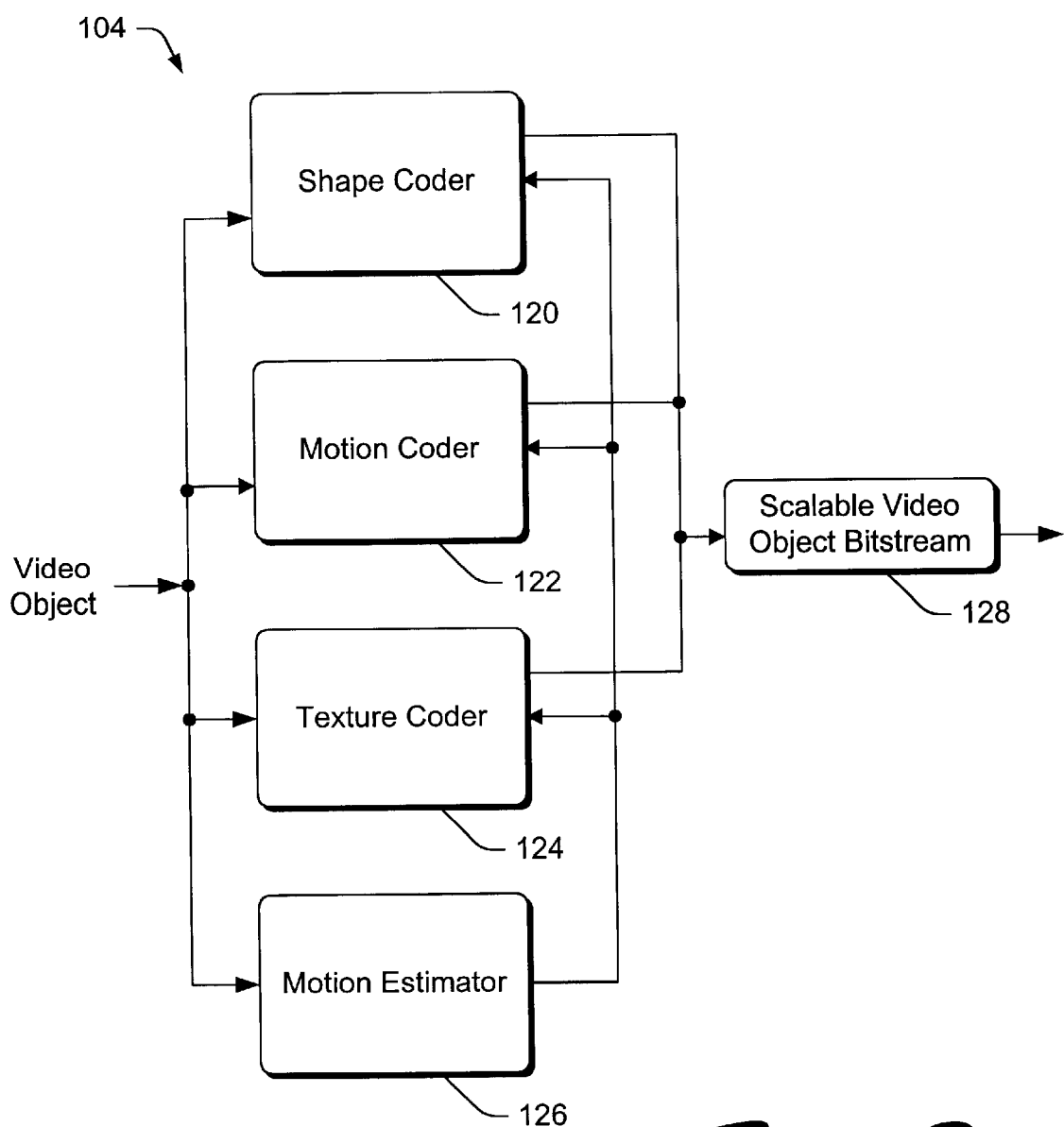
FIG. 3 is functional block diagram depicting an exemplary arrangement for coding video object information to produce a video object bitstream.

FIG. 3 depicts an exemplary video object coder 104. As depicted, applicable video object information is provided to a shape coder 120, a motion coder 122, a texture coder 124, and a motion estimator 126. Motion estimator 126 is configured to estimate the motion of each pixel within the boundary of the object and communicate or otherwise provide corresponding motion estimation information to each of the coders 120–124. The output from each coder 120–124 is then provided in the form of a scalable video object bitstream 128.

Shape, motion, texture, and motion vector estimation information and various associated processing techniques are well known to those skilled in the art, and are particularly well known in the MPEG community. Consequently, this description will focus on those aspects that are significantly modified or otherwise altered to support the exemplary improvements identified herein. In particular, the majority of the remaining description will focus on improvements associated with a texture coder 124. It should be kept in mind, however, that the various methods and arrangements are also applicable/adaptable to motion and shape information as well.

Figure 4:
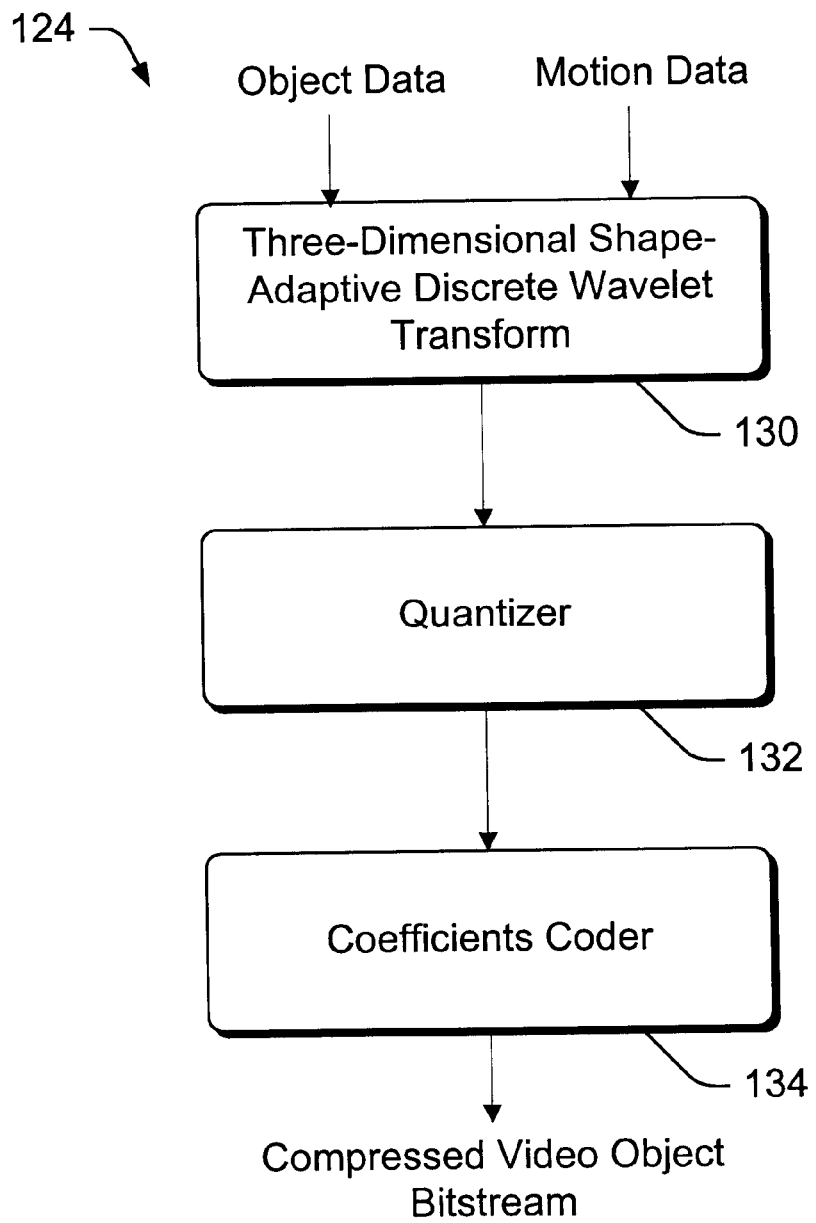
FIG. 4 is a functional block diagram depicting an exemplary arrangement for coding video object information using a three-dimensional (3D) shape-adaptive discrete wavelet transform (SA-DWT) to produce a video object bitstream.

FIG. 4 depicts an exemplary texture coder 124 that is configured to code video object information using a three-dimensional (3D) shape-adaptive discrete wavelet transform (SA-DWT) 130. As shown, motion estimation information and object boundary information is provided to 3D SA-DWT 130, which is configured to provide transformed information to a quantizer 132. Quantizer 132 is configured to selectively scale the transformed information (i.e., 3D SA-DWT coefficients) and to output corresponding quantized information to a coefficients coder 134. Coefficients coder 134 is configured to further encode the quantized information (e.g., scaled 3D SA-DWT coefficients) and output a corresponding compressed video object bitstream.

In this example, 3D SA-DWT 130 produces 3D SA-DWT coefficients that correspond to the texture of each pixel within the boundary of an object during a sequence of frames. As described in the examples that follow, the 3D SA-DWT coefficients are essentially produced in a two-stage process. The first stage includes the application of a one-dimensional temporal SA-DWT to a temporal thread that extends between corresponding pixels that lie in frames that are organized in a video sequence. The second stage includes the application of a two-dimensional (2D) spatial SA-DWT for each frame in the video. Here, the 2D SA-DWT is applied to applicable temporal SA-DWT coefficients that have been placed in spatial positions corresponding to the original pixel positions to maintain the spatial correlation within each frame.

Performing the 2D spatial SA-DWT produces 3D SA-DWT coefficients. The 3D SA-DWT coefficients may then be coded using a coding scheme to produce a compressed representation of the video sequence. As a result of the 3D SA-DWT, the corresponding/resulting video object is scalable in all dimensions including the temporal direction. This coding scheme can be performed for each aspect of a video signal that defines an object, including shape, motion, and texture.

The resulting coded video signal is then either stored for later use or is communicated over a channel 106 to video object decoder 108 (see FIG. 2). If the coded video signal is stored, it can be stored on any suitable storage medium. Examples include both read-only memory and read/writable memories such as disks, CDs, DVDs, tapes, and the like. If the coded video signal is communicated over a channel, it can be communicated over any suitable communication channel. Examples include data buses, local-area network, wide-area networks, the Internet, an Intranet, direct communication links, radio, and the like.

An example application in which the video signal is either stored or communicated over a channel includes video conferencing. Another example application is the storing, downloading, or communication of video sequences for movies or video streaming, gaming, or any other purpose.

Figure 5:
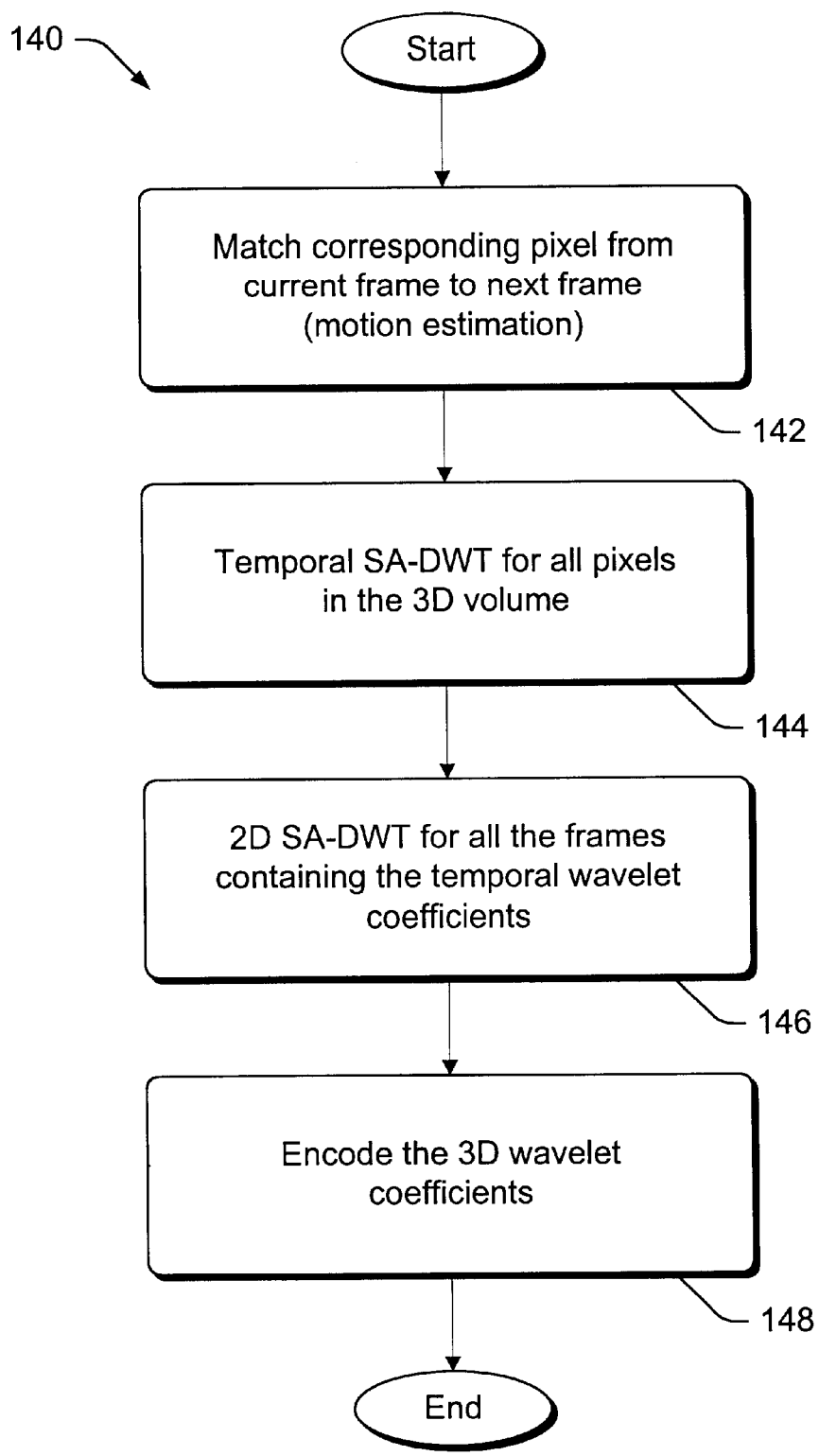
FIG. 5 is a flowchart depicting an exemplary three-dimensional (3D) shape-adaptive discrete wavelet transform (SA-DWT) process suitable for producing a video object bitstream.

Reference is now made to the flowchart depicted in FIG. 5. Here, an exemplary process 140 is presented. In step 142, a matching operation estimates or otherwise predicts the motion of each pixel within the object boundary from one frame to the next. Pixels are then organized into at least one temporal thread that maintains the spatial relationship between the pixels, both within each frame and between frames in the temporal direction. In this manner, the corresponding pixels from each frame can be logically linked together to form temporal threads.

Figure 6:
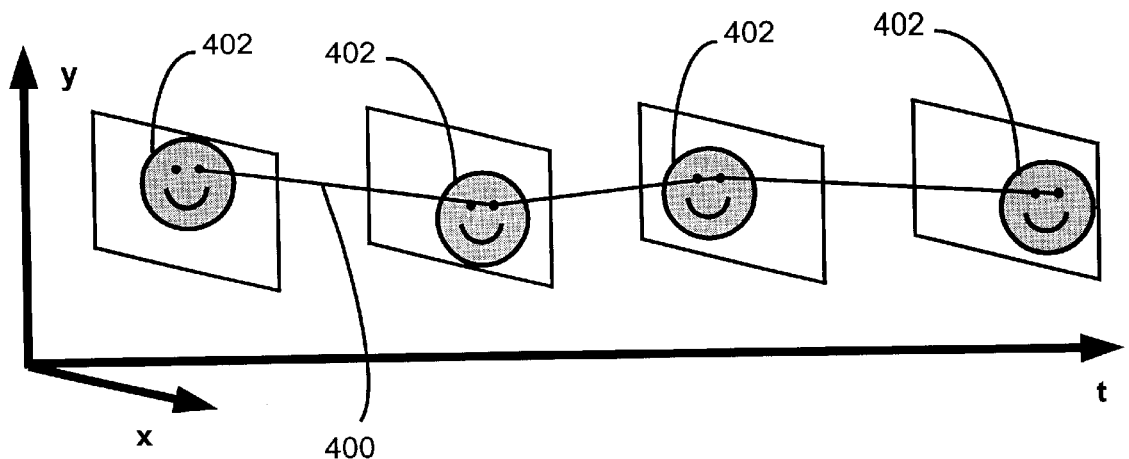
FIG. 6 is an illustrative representation of a temporal thread that extends between corresponding pixels that lie in frames that are organized in a video sequence.

As illustrated in FIG. 6, a thread 400 defines the spatial relationship between corresponding pixels, $P_0$–$P_3$, of an object boundary 402 from one frame to another. In this example, thread 400 begins as a pixel emerges within object boundary 402 and ending when the pixel terminates or ceases to exist within the object boundary 402.

Returning to FIG. 5, in step 144, a one-dimensional temporal SA-DWT is applied to the pixels of each thread 400 to generate a wavelet coefficient for each pixel that is within the object boundary. This is done for a plurality of threads and/or for each pixel within the object's 3D volume in the video sequence.

The wavelet coefficients generated in step 144 are derived by passing the video signals corresponding to each thread through lowpass and highpass filters to form lowpass and highpass threads, respectively. The extracted wavelet coefficients for each thread are organized into a one-dimensional array that extends along the temporal direction, which are redistributed to their corresponding spatial position within each frame of the video sequence. The lowpass and highpass threads are subsampled to extract the desired wavelet coefficients. In accordance with certain exemplary implementations there is one temporal SA-DWT coefficient for each pixel in the temporal thread. Thus, a 2D array of temporal SA-DWT coefficients can be established that spatially corresponds to an original video frame.

Next, in step 146, a 2D SA-DWT is applied to each of the 2D arrays of temporal SA-DWT coefficients corresponding to the frames in the video sequence. The 2D SA-DWT generates a three-dimensional array of wavelet coefficients. Steps 142, 144, and 146, together, provide the exemplary 3D SA-DWT.

Step 148 provides a coding operation, wherein the 3D SA-DWT coefficients from step 146, which are now organized in a 3D array, are coded. Here, the 3D SA-DWT coefficients can be coded using one of several possible schemes, such as, for example, a zerotree entropy coding extension, 3D SPIHT, a JPEG 2000 entropy coding extension, or the like.

As a result of process 140, a compressed and fully scalable video bitstream is generated for either storage and/or communication over channel 106.

Figure 7:
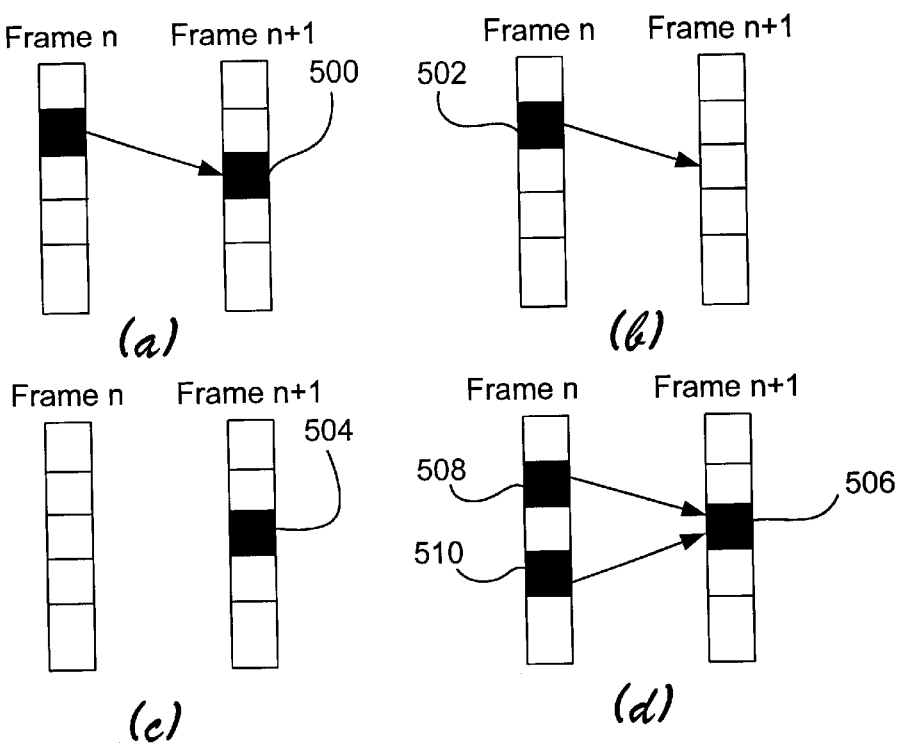
FIGS. 7(a–d) is illustrative representations of different types of pixels that exist in a temporal thread that extends between corresponding pixels that lie in frames that are organized in a video sequence.

Referring to FIGS. 7(a–d), there are four types of pixels that can be found within the boundary of a video object and that form threads 400. These different types of pixels are inherently defined by the movement and/or changing shape of an object from frame to frame in the video sequence. The four types of pixels are continuing pixels, terminating pixels, emerging pixels, and colliding pixels.

For simplicity, the video frames depicted in FIGS. 7, 8, and 10–13 are shown as one-dimensional columns. It should be clear that each frame is, nevertheless, a two-dimensional array as illustrated in FIG. 6.

As shown in FIG. 7(a), continuing pixels 500 are the most common type of pixel. They have a one-to-one correspondence between two frames, and the temporal thread connects or extends between corresponding pixels that lie in adjacent frames. As shown in FIG. 7(b), terminating pixels 502 do not have any corresponding pixels in the next frame in the video sequence. Accordingly, the temporal thread of pixels ends at this terminating pixel 502. All of the pixels in the last frame of a given video sequence are terminating pixels. As shown in FIG. 7(c), emerging pixels 504 do not have a corresponding pixel in the previous frame. Emerging pixels 504 start a new temporal thread 400, and hence a new one-dimensional array of wavelet coefficients. As shown in FIG. 7(d), colliding pixels 506 are pixels that have two or more corresponding pixels in the previous frame. In this situation, colliding pixel 506 is deemed to be continuing to only one of the corresponding pixels 508 from the previous frame and added to that pixels temporal thread. All of the other corresponding pixels 510 in the previous frame are marked or flagged as terminating pixels.

Figure 8:
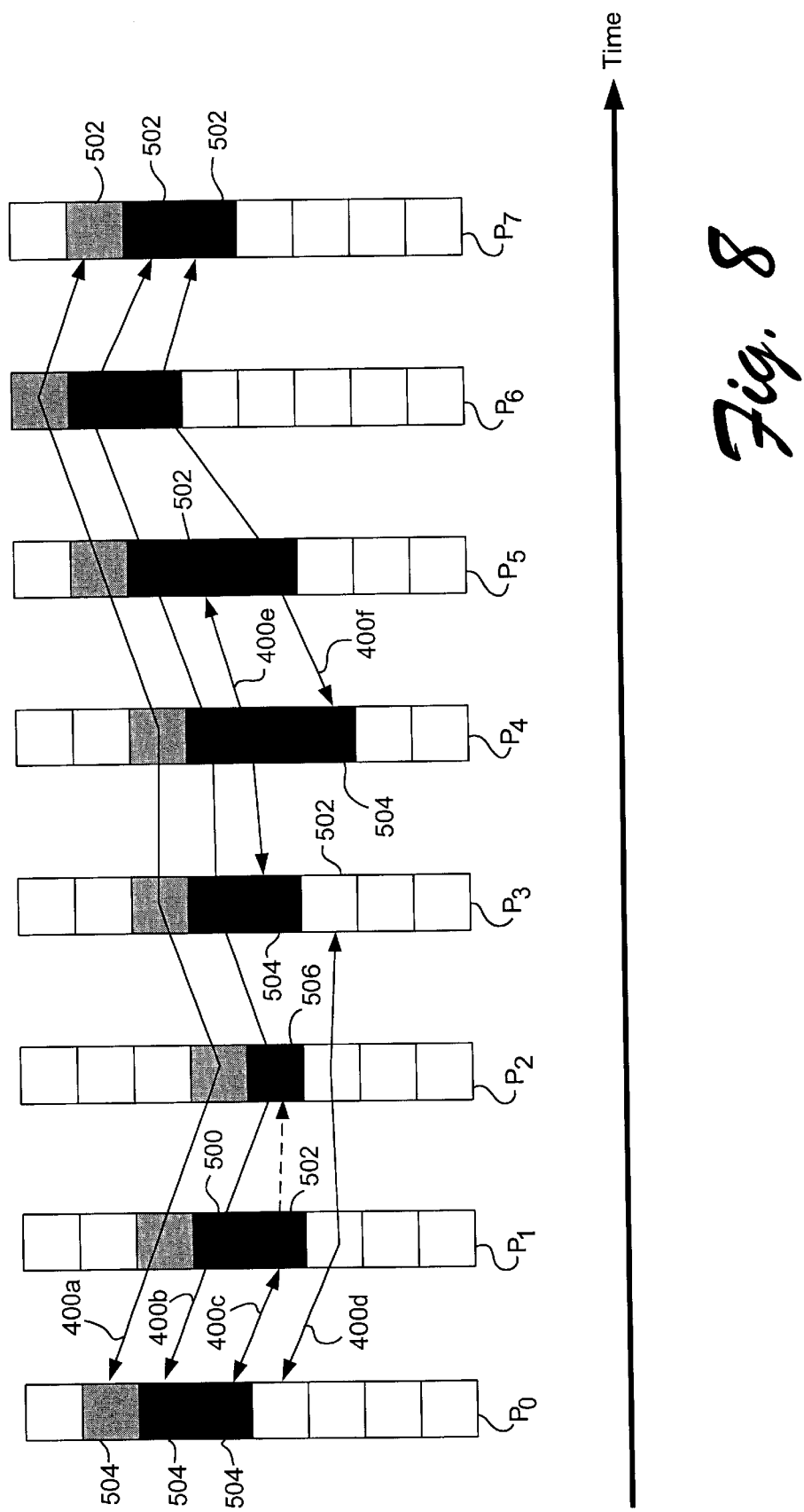
FIGS. 8–11 are illustrative representations of the identification/formation and processing of temporal threads that extend between corresponding pixels that lie in frames that are organized in a video sequence.

The formation of the threads and distribution of the wavelet coefficients is illustrated in FIGS. 8–11. As shown in FIG. 8, threads 400a–400f between corresponding pixels are established. Emerging pixels 504 form the start of each thread 400a–400f, and terminating pixels 502 form the end of each thread 400a–400f. Additionally, if there is a colliding pixel 506, one of the previous corresponding pixels is marked as a continuing pixel 500 and the other corresponding pixel is marked and treated as a terminating pixel 502. In this example, all of the pixels in the first frame $P_0$ are emerging pixels 504, and all of the pixels in the last frame $P_7$ are terminating pixels 502.

Figure 9:
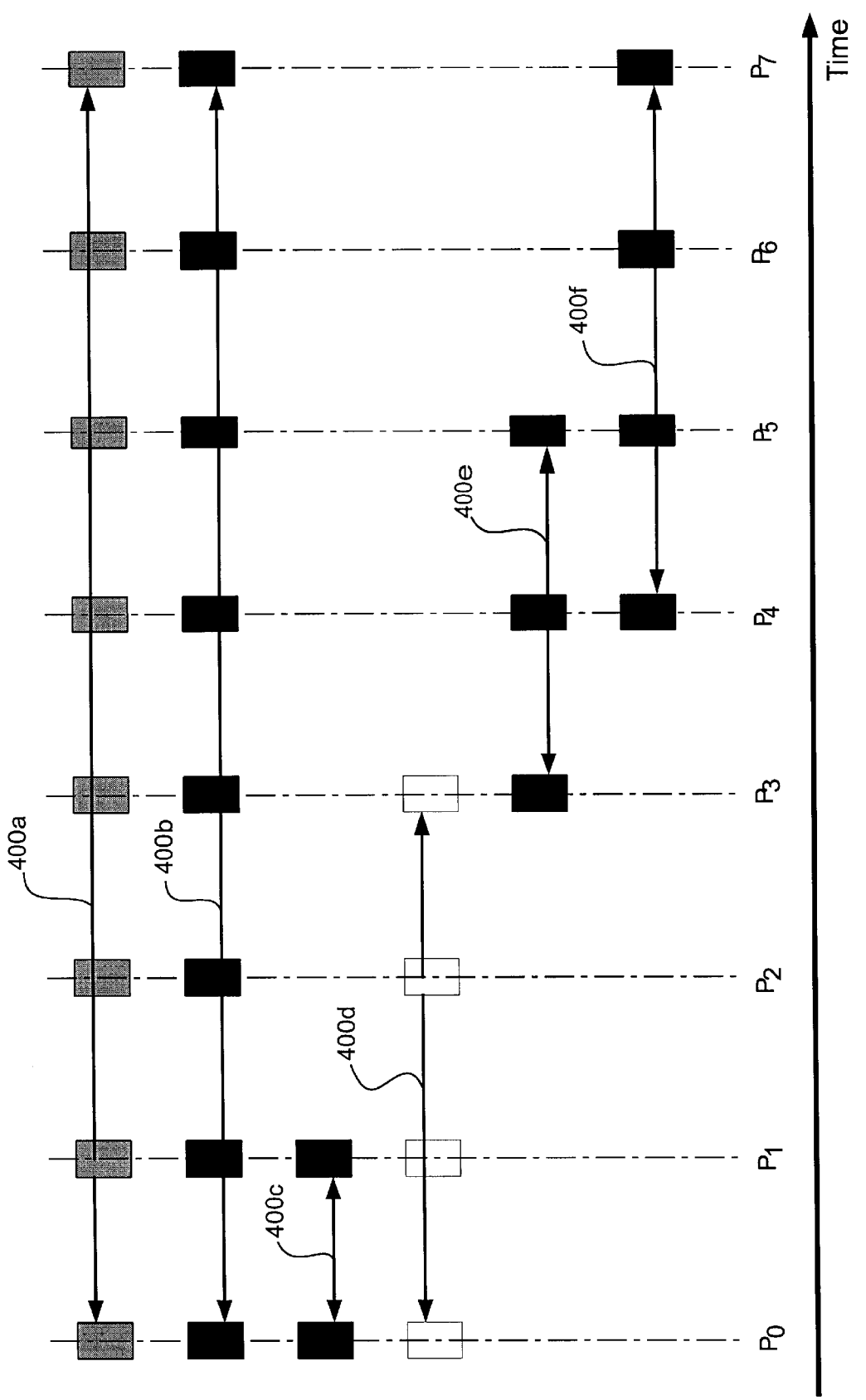

As illustrated in corresponding FIG. 9, each thread 400a–400f maintains the temporal position for each of the pixels within that thread 400a–400f, respectively, while the wavelet coefficients for each of the pixels are derived.

Figure 10:
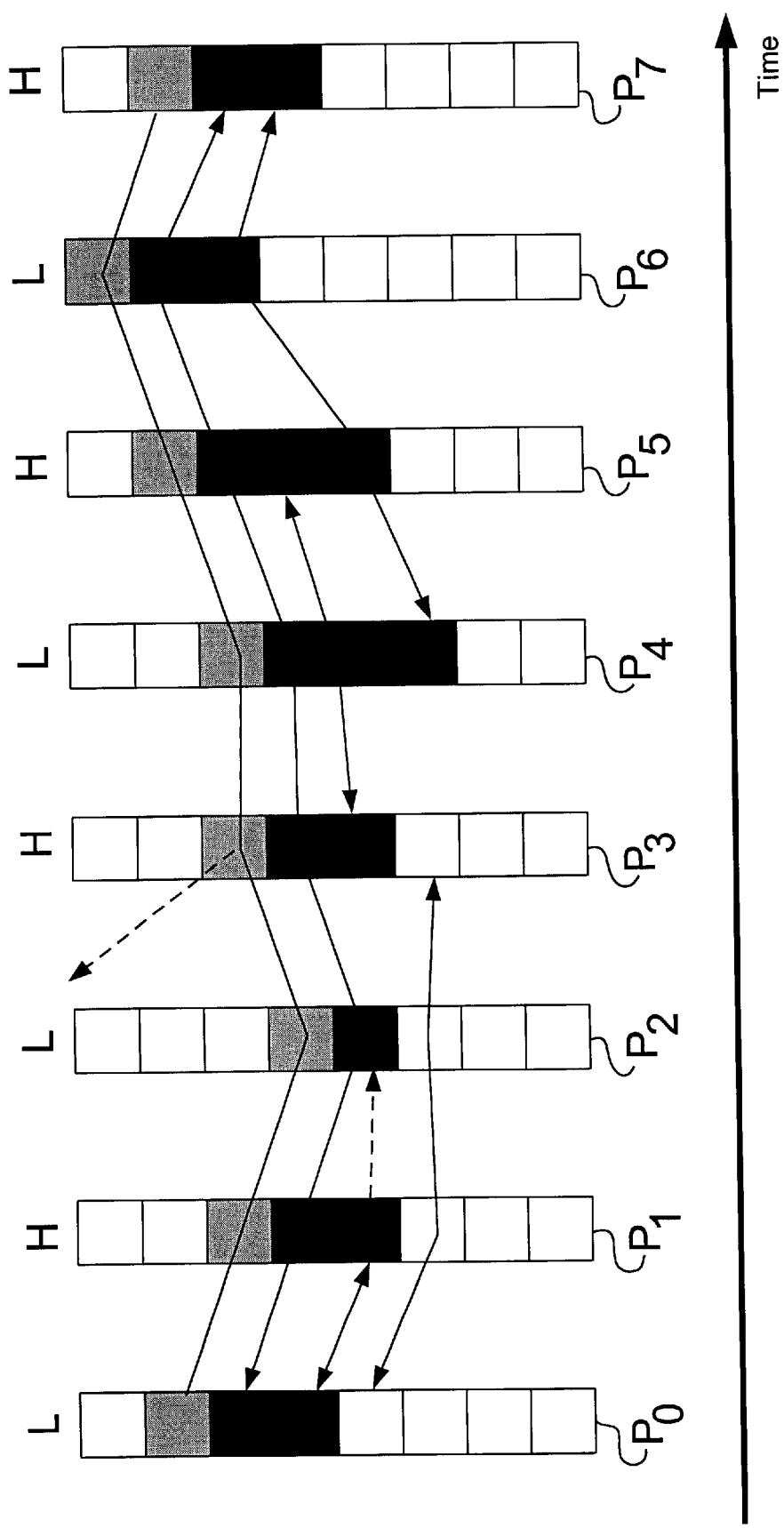

In FIG. 10, the signals embodying the threads 400a–400f are passed through both highpass and low pass filters, as denoted by "H" and "L", respectively. This operation forms a lowpass thread and a highpass thread and derives wavelet coefficients for each of the pixels. The lowpass thread is then subsampled at even frames $P_0$, $P_2$, . . . and the highpass thread is subsampled at odd frames $P_1$, $P_3$, . . . . The subsampling operation extracts wavelet coefficients from the threads, which can then be redistributed to their corresponding pixel's position within each frame.

Figure 11:
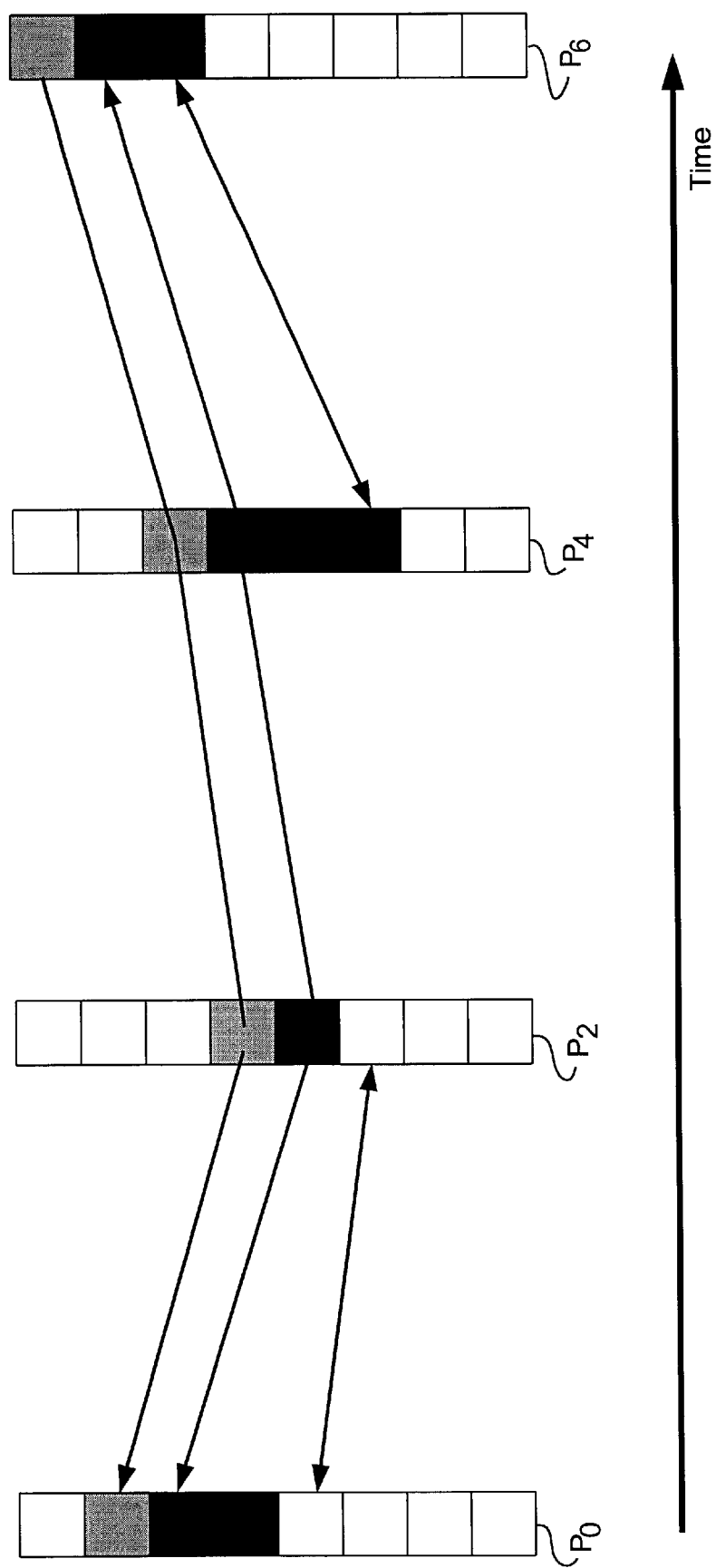
Figure 12:
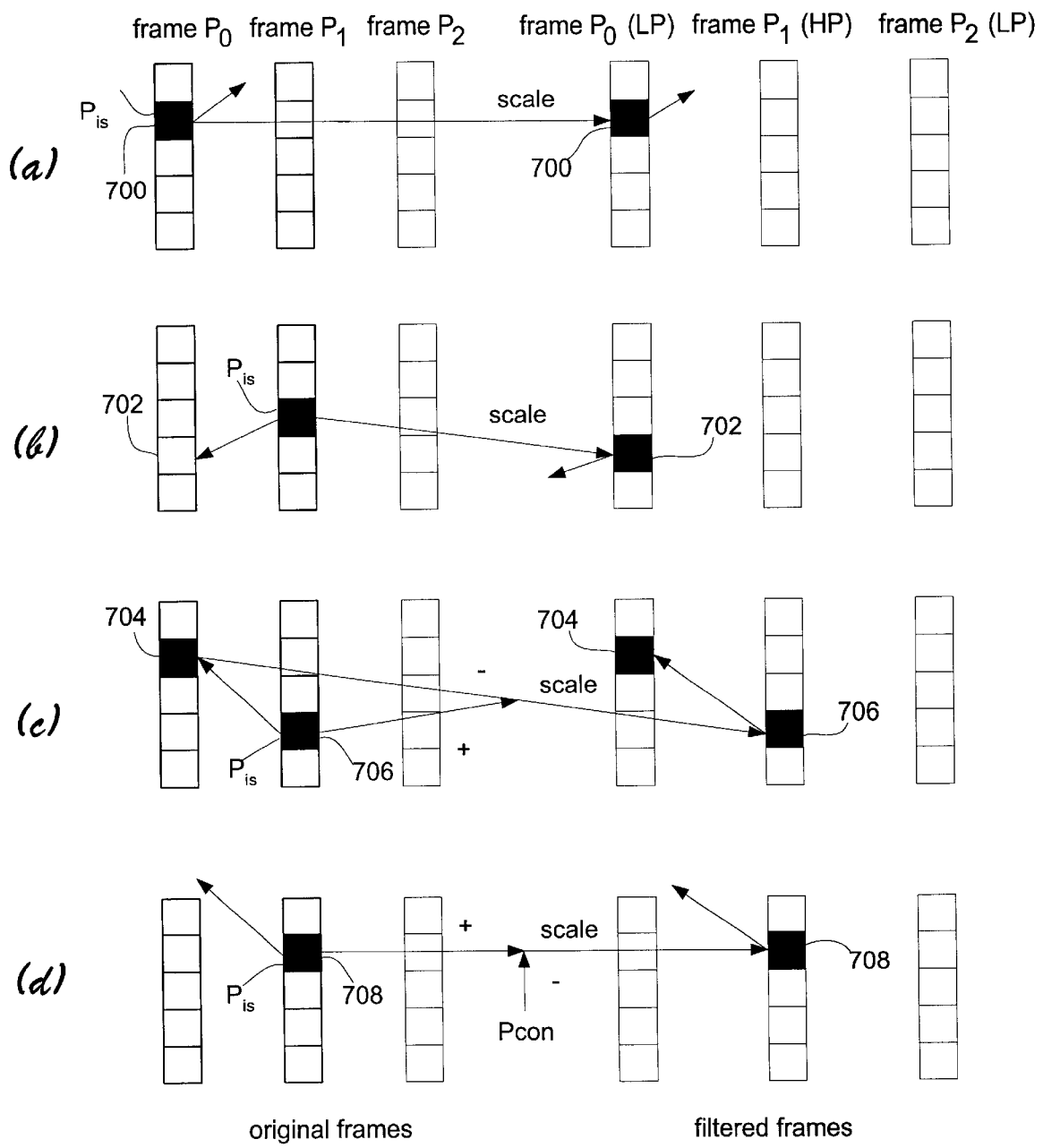
FIGS. 12(a–d) are illustrative representations depicting the treatment of isolated pixels during the processing of temporal threads that extend between corresponding pixels that lie in frames that are organized in a video sequence.

As depicted in FIG. 11, the lowpass frames can be grouped together and the process repeated if further decomposition of the video signal is desired. The operations of forming and processing threads are then repeated for the video sequence of lowpass frames.

One possible algorithm for executing the three-dimensional SA-DWT (i.e., matching operation 142, first wavelet operation 144, and second wavelet operation 146) is as follows.

Given a group or sequence of frames $P_i$, for i=0, . . . , N−1, the motion of each pixel with reference to the next picture is obtained using a motion estimation algorithm. A block-matching algorithm is an example of such an algorithm.

An exemplary algorithm is as follows:

1 Initialization: Set i=0 and mark all pixels within the object boundary, in all of these N frames, as UNSCANNED.

2 Form threads for the temporal SA-DWT process:

2.1 Execute the following steps for every pixel $p_i(x_i, y_i)$ within the object boundary in frame $P_i$:

2.1.1 If the pixel $p_i(x_i, y_i)$ is marked as UNSCANNED, set the pixel as the first pixel of a new temporal thread. Set j=i. Otherwise, process next pixel with the object boundary.

2.1.2 If the pixel $p_j(x_j, y_j)$ is a terminating pixel, then it is the last pixel of this temporal thread. Go to step 2.14. If the pixel $p_j(x_j, y_j)$ is not a terminating pixel and its corresponding pixel $p_{j+1}(x_{j+1}, y_{j+1})$ in frame $P_{j+1}$ is marked as UNSCANNED, where $(x_{j+1}, y_{j+1})=(x+mv_x, y+mv_y)$ and $(mv_x, mv_y)$ is the motion vector from pixel $p_j(x_j, y_j)$ in frame $P_j$ to its corresponding pixel $p_{j+1}(x_{j+1}, y_{j+1})$ in frame $P_{j+1}$, then add pixel $p_{j+1}(x_{j+1}, y_{j+1})$ to this temporal thread and mark it as SCANNED.

2.1.3 Set j=j+1. If j<N, go to step 2.1.2.

2.1.4 Perform a one-dimensional, arbitrary-length wavelet filtering for this temporal thread:

$$p_k(x_k, y_k), k=i, \ldots, j-1$$

and obtain a transformed lowpass thread:

$$L_k(x_k, y_k), k=i, \ldots, j-1;$$

and a transformed highpass thread:

$$H_k(x_k, y_k), k=i, \ldots, j-1.$$

2.1.5 Place the lowpass coefficients $L_k(x_k, y_k)$ into the lowpass frame k at position $(x_k, y_k)$. Place the highpass coefficients $H_k(x_k, y_k)$ into the highpass frame k at position $(x_k, y_k)$.

3 Set i=i+1. If i<N, go to step 2.1 to form and process the next temporal thread.

4 Subsample the lowpass frames at even frames to obtain temporal lowpass frames. Subsample the highpass frames at odd frames to obtain temporal highpass frames.

5 If more temporal decomposition levels are needed, repeat steps 1–4 for the lowpass frames. Note that the motion vectors from frame $P_k$ to $P_{k+2}$ can be obtained by adding the motion vectors from $P_k$ to $P_{k+1}$ and $P_{k+1}$ to $P_{k+2}$ (except isolated pixels).

6 Perform a spatial two-dimensional SA-DWT transforms according to their spatial shapes for every temporally transformed frame.

In one possible embodiment, the boundaries of the object are extended prior to execution of this exemplary algorithm to fill out a boundary box having predetermined dimensions. This extension maintains the perfect reconstruction properties of the three-dimensional SA-DWT. In the extension, the undefined pixel locations outside the finite signal segment are filled with values relating to the pixels inside the finite signal segment. If, for example, odd symmetric biorthogonal wavelet filters are used to derive the wavelet coefficients, as discussed below, then a symmetric extension can be used to extend the signal segment. However, other extension techniques, such as a periodic extension may be used in other implementations.

Additionally, the exemplary algorithm set forth above presumes that the motion estimation scheme associates at least one motion vector with each pixel. The motion vector can be determined, for example, by comparing the position of each pixel in a frame $P_i$ to the position of the corresponding pixel in the next frame $P_{i+1}$ in the video sequence. If the motion estimation scheme could not identify a matching pixel $P_{-1}$ in the forward direction, it looks for a matching pixel in the backward direction. If the motion estimation scheme could not find a direction in either direction, the pixel is an isolated pixel, $P_{is}$, and it derives a motion vector from neighboring pixels. In this scheme every pixel initially has a motion vector.

As illustrated in FIG. 12(a), if pixel $P_{is}$, is in an even frame, it can be scaled by sqrt(2) and sqrt(2)$P_{is}$ and then put back into the same position 700 in the even frame. In the scenario illustrated in FIG. 12(b), pixel $P_{is}$ is in an odd frame and its motion vector points to a position 702 in the previous even frame where there is no pixel within the video object. In this scenario pixel, $P_{is}$ can be scaled by sqrt(2) and sqrt(2)$P_{is}$ and put into the position in the previous even frame that is pointed to by its motion vector.

As illustrated in FIG. 12(c), the isolated pixel $P_{is}$ is in an odd frame and its motion vector points to a position 704 in the previous even frame where there is a pixel $P_{pre}$ within the video object. The value sqrt(2)/2($P_{is}-P_{pre}$) is put into the same position 706 as pixel $P_{is}$ in the odd frame.

In FIG. 12(d), the isolated pixel is in an odd frame and its motion vector points to a position outside bounding box. A constant value $P_{con}$ is used for the pixel's wavelet coefficient and sqrt(2)/2($P_{is}-P_{con}$) is put into the same position 708 as pixel $P_{is}$ in the odd frame. In these scenarios, all the transformed coefficients from the isolated pixels inherit the motion vector from the isolated pixels.

As discussed in more detail below, this algorithm also presumes that odd-symmetric biorthogonal wavelet filters are used to generate the 3D SA-DWT coefficients, although other apes of wavelet filters can also be used.

By way of example, decomposing filter algorithms for use in both video object coder 104 and video object decoder 108 can be defined by:

$$T(i) = \sum_{j=0}^{L_g-1} x(i+j-(L_g-1)/2)g(L_g-1-j) \quad \text{(lowpass)} \tag{1}$$

$$S(i) = \sum_{j=0}^{L_h-1} x(i+j-(L_h-1)/2)h(L_h-1-j) \quad \text{(highpass)} \tag{2}$$

where T(i) and S(i) are the lowpass band and highpass band filter outputs before subsampling. Additionally, {g(i), i=0, ..., $L_g$-1}, {h(i), i=0, ..., $L_h$-1}, {e(i), i=0, ..., $L_e$-1}, and {f(i), i=0, ..., $L_g$-1} are the impulse responses of the lowpass filter, highpass filter, lowpass synthesis filter, and highpass synthesis filter, respectively.

Here, the wavelet coefficients from the analysis are obtained by subsampling the above filtering results by a factor of two. Subsampling can be either at even positions or at odd positions. However, in order to use symmetric extensions, the subsampling of lowpass coefficients and that of highpass coefficients always includes one sample shift. If the subsampling positions of lowpass coefficients are even, then the sub-sampling positions of highpass coefficients should be odd, or vice versa. An exemplary subsampling process is described as follows:

$$C(i)=T(2i-s); \tag{3}$$

$$D(i)=S(2i+1-s) \tag{4}$$

where C(i) and D(i) are the lowpass and highpass wavelet coefficients respectively. Here, s=0 if the lowpass subsampling positions are even and s=1 if the lowpass subsampling positions are odd. Note that subsampling of highpass coefficients always includes one sample advance.

To perform synthesis, these coefficients are first upsampled by a factor of 2. The upsampling process is given as follows:

$$P(2i-s)=C(i); P(2i+1-s)=0; \tag{5}$$

$$Q(2i+1-s)=D(i); Q(2i+s)=0; \tag{6}$$

where P(k) and Q(k) are upsampled lowpass and highpass coefficients, respectively. Then the synthesis filtering process is given as follows:

$$u(i) = \sum_{j=0}^{L_h-1} P(i-(L_h-1)/2+j)e(L_h-1-j), \quad \text{(lowpass)} \tag{7}$$

$$v(i) = \sum_{j=0}^{L_h-1} Q(i-(L_g-1)/2+j)f(L_g-1-j), \quad \text{(highpass)} \tag{8}$$

$$r(i)=u(i)+v(i). \tag{9}$$

where r(i) is the reconstructed signal.

Assuming a signal segment {x(j), j=0, ..., N=1}, with length of N, and combining symmetric extensions, filtering, and subsampling together, the arbitrary length wavelet decomposition using odd symmetric wavelet transform can be described as follows:

1. If N=1, this isolated sample is repeatedly extended and the lowpass wavelet filter is applied to obtain a single lowpass wavelet coefficient. (Note: this is equivalent to scaling this sample by a factor $K=\Sigma_{i=0}^{L_g-1} g(i)$ and it happens to be $\sqrt{2}$ for some normalized biorthogonal wavelets). The synthesis process simply scales this single lowpass wavelet coefficient by a factor of 1/K and puts it in the correct position in the original signal domain.

2. If N is greater than 1 and is even, the leading boundary and the trailing boundary of the signal segment are extended. The N/2 lowpass wavelet coefficients C(i), i=s, ..., N/2−1+s, are generated by using Eq. (1) and (3). The N/2 highpass wavelet coefficients D(i), i=0, ..., N/2−1, are generated by using Eq. (2) and (4). The synthesis process begins with upsampling the lowpass and highpass wavelet coefficients using Eq. (5) and (6), respectively. As the results, an upsampled lowpass segment P(j) and an upsampled highpass segment Q(i) are obtained, where j=0, ..., N−1. The upsampled lowpass and highpass segments P(j) and Q(j) are then extended at the leading boundaries and the trailing boundaries. The extended lowpass and highpass signal P(j) and Q(j) are then synthesized using Eq. (7), (8), and (9) to reconstruct the signal segment r(j),j=0, ..., N−1.

3. If N is greater than 1 and is odd, the leading boundary and the trailing boundary of the signal segment are extended. The (N+1)/2−s lowpass wavelet coefficients C(i), i=s, ..., (N+1)/2−1, are generated by using Eq. (1) and (3). The (N−1)/2+s highpass coefficients D(i), i=0, ..., (N−1)/2−1+s, are generated by using Eq. (2) and (4).

Figure 13:
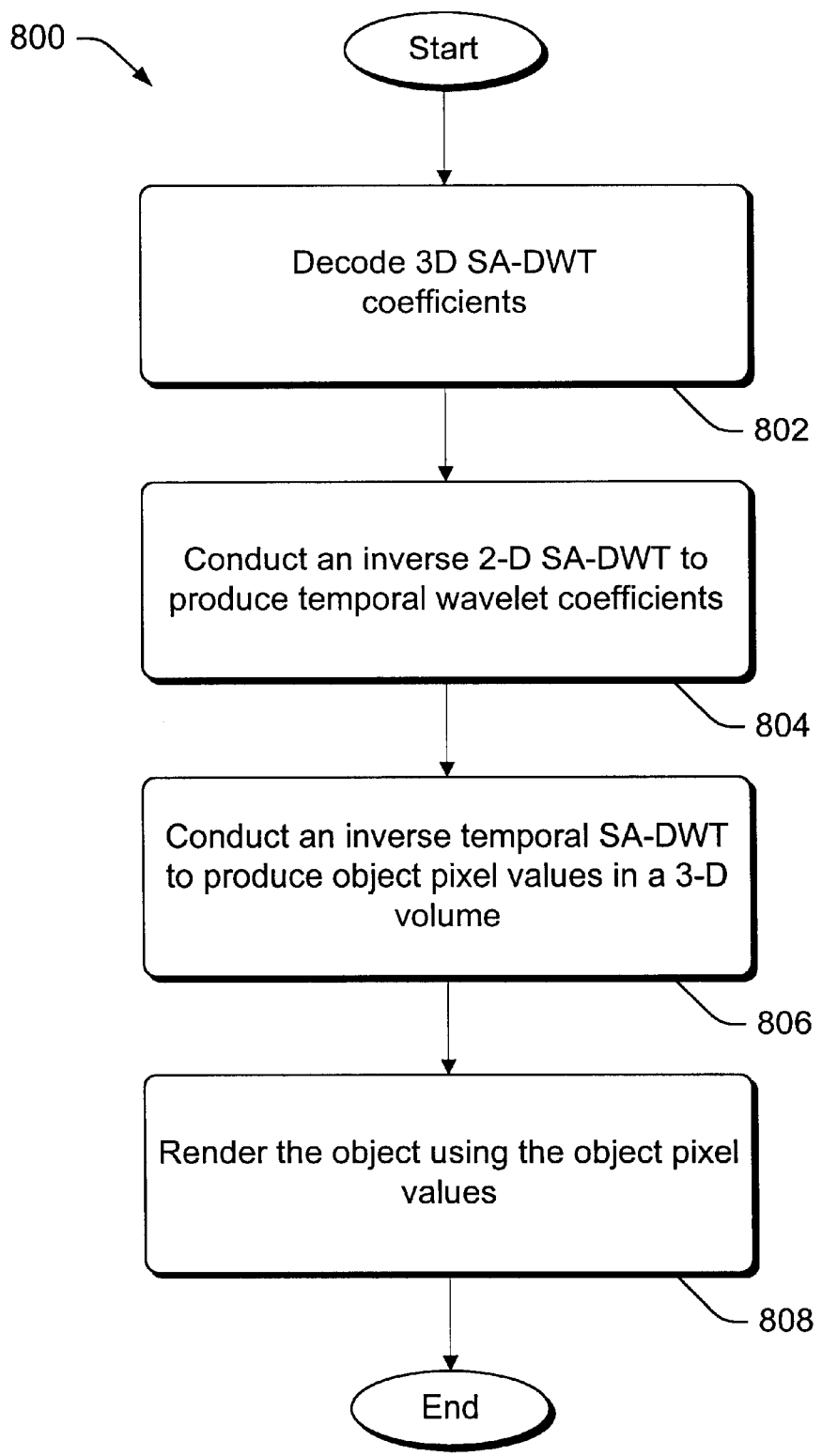
FIG. 13 is a flowchart depicting an exemplary decoding and inverse three-dimensional (3D) shape-adaptive discrete wavelet transform (SA-DWT) process suitable for rendering an object from a video object bitstream.

Reference is now made to the flowchart depicted in FIG. 13. Here, a process 800 is provided for an exemplary inverse 3D SA-DWT process suitable for rendering an object from a video object bitstream. In step 802, the 3D SA-DWT coefficients from within a compressed video object bitstream are decoded. Next, in step 804, an inverse 2-D SA-DWT is conducted to produce temporal wavelet coefficients from the 3D SA-DWT coefficients. In step 806, an inverse temporal SA-DWT is conducted to produce object pixel values in a 3D volume, and therefore, for the object in each frame within the 3D volume. In step 808, the object is rendered using the object pixel values from step 806.

Although some preferred embodiments of the various methods and arrangements of the present invention have been illustrated in the accompanying Drawings and described in the foregoing Detailed Description, it will be understood that the invention is not limited to the exemplary embodiments disclosed, but is capable of numerous rearrangements, modifications and substitutions without departing from the spirit of the invention as set forth and defined by the following claims.

What is claimed is:

1. A video coding method comprising:
    wavelet transforming a one-dimensional array of pixel values selected from a sequence of video frames to produce a corresponding one-dimensional array of temporal wavelet coefficients;
    arranging the temporal wavelet coefficients within a plurality of two-dimensional coefficient arrays substantially corresponding to a spatial arrangement of the pixel values within the sequence of video frames; and
    wavelet transforming each of the two-dimensional coefficient arrays to produce corresponding three-dimensional wavelet coefficients associated with the sequence of video frames.

2. The method as recited in claim 1, wherein wavelet transforming the one-dimensional array of pixel values further includes using a shape-adaptive discrete wavelet transform to produce the corresponding one-dimensional array of temporal wavelet coefficients.

3. The method as recited in claim 1, wherein wavelet transforming each of the two-dimensional coefficient arrays further includes using a shape-adaptive discrete wavelet transform to produce the corresponding three-dimensional wavelet coefficients associated with the sequence of video frames.

4. The method as recited in claim 1, wherein wavelet transforming the one-dimensional array of pixel values further includes:
    selectively associating pixel values with a pixel thread that runs in a temporal direction associated with the sequence of video frames;
    aligning spatially corresponding pixel values in the temporal direction; and
    identifying each pixel value as either a continuing pixel, an emerging pixel, a terminating pixel, or a colliding pixel within the pixel thread, or otherwise an isolated pixel.

5. The method as recited in claim 4, wherein selectively associating pixel values with the pixel thread includes estimating a motion of at least one pixel with respect to the sequence of video frames.

6. The method as recited in claim 5, wherein the one-dimensional array of pixel values includes at least one pixel thread that logically extends through at least two sequential video frames.

7. The method as recited in claim 4, wherein wavelet transforming the one-dimensional array of pixel values further includes:
    determining a boundary for an arbitrarily shaped object image within at least a portion of the sequence of video frames, the boundary having at least one pixel value therein; and
    wavelet transforming each of the pixel values within an arbitrarily shaped object image.

8. The method as recited in claim 1, wherein arranging the temporal wavelet coefficients within the plurality of two-dimensional coefficient arrays further includes:
    maintaining spatial alignment information for each pixel value; and
    redistributing the resulting temporal wavelet coefficients to corresponding spatial positions in each video frame.

9. The method as recited in claim 4, wherein wavelet transforming the one-dimensional array of pixel values further includes:
    applying a lowpass filter to the pixel values to produce a corresponding lowpass thread having lowpass coefficients; and
    applying a highpass filter to the pixel values to produce a corresponding highpass thread having highpass coefficients.

10. The method as recited in claim 9, wherein wavelet transforming the one-dimensional array of pixel values further includes:
    applying a lowpass filter to lowpass coefficients.

11. The method as recited in claim 9, wherein wavelet transforming the one-dimensional array of pixel values further includes:
    sampling even frames in the lowpass thread to obtain the lowpass coefficients; and
    sampling odd frames in the highpass thread to obtain the highpass coefficients.

12. The method as recited in claim 7, wherein wavelet transforming the one-dimensional array of pixel values further includes:
    identifying video frames as either even frames or odd frames;
    determining a motion vector for each isolated pixel within the object; and
    if a given isolated pixel is in an even frame, scaling the temporal wavelet coefficient related to the given isolated pixel by the square root of two (sqrt(2)).

13. The method as recited in claim 7, wherein wavelet transforming the one-dimensional array of pixel values further includes:
    identifying video frames as either even frames or odd frames;
    determining a motion vector for each isolated pixel within the object;
    if a given isolated pixel is in an odd frame and the motion vector for the given isolated pixel points to a pixel position in a previous even frame that is not within the object, scaling the wavelet coefficient related to the given isolated pixel by the square root of two (sqrt(2)); and
    assigning the scaled wavelet coefficient to the spatial pixel position pointed to by the motion vector.

14. The method as recited in claim 7, wherein wavelet transforming the one-dimensional array of pixel values further includes:
    identifying video frames as either even frames or odd frames;
    determining a motion vector for each isolated pixel within the object;

if a given pixel is in an odd frame and the motion vector for the given isolated pixel points to a pixel position in a previous even frame that is within the object, scaling the wavelet coefficient related to the given isolated pixel by $\sqrt{2}/2(P_{is}-P_{pre})$, where $P_{is}$ is the temporal wavelet coefficient of the given isolated pixel and $P_{pre}$ is the wavelet coefficient of the pixel pointed to by the motion vector; and assigning the scaled wavelet coefficient to the pixel position pointed to by the motion vector.

15. The method as recited in claim 7, wherein wavelet transforming the one-dimensional array of pixel values further includes:

identifying video frames as either even frames or odd frames;

determining a motion vector for each isolated pixel within the object;

determining a motion vector for each isolated pixel within the object, wherein each object is positioned within a bounding box; and if a given pixel is in an even frame and the motion vector for the given isolated pixel points to a pixel position in a previous even frame that is outside of the bounding box, assigning the pixels in each layer a wavelet coefficient having a constant value, $P_{con}$, and scaling the wavelet coefficient for the given isolated pixel by $\sqrt{2}/2(P_{is}-P_{con})$.

16. The method as recited in claim 1, further comprising: scaling the three-dimensional wavelet coefficients associated with the sequence of video frames.

17. The method as recited in claim 1, further comprising: encoding the three-dimensional wavelet coefficients associated with the sequence of video frames.

18. The method as recited in claim 1, further comprising: storing the three-dimensional wavelet coefficients associated with the sequence of video frames.

19. The method as recited in claim 1, further comprising: transmitting the three-dimensional wavelet coefficients associated with the sequence of video frames.

20. The method as recited in claim 1, further comprising: selectively rendering the sequence of video frames using the three-dimensional wavelet coefficients.

21. A computer-readable medium having computer-executable instructions for performing steps comprising:

wavelet transforming a one-dimensional array of pixel values selected from a sequence of video frames to produce a corresponding one-dimensional array of temporal wavelet coefficients;

arranging the temporal wavelet coefficients within a plurality of two-dimensional coefficient arrays substantially corresponding to a spatial arrangement of the pixel values within the sequence of video frames; and wavelet transforming each of the two-dimensional coefficient arrays to produce corresponding three-dimensional wavelet coefficients associated with the sequence of video frames.

22. The computer-readable medium as recited in claim 21, wherein wavelet transforming the one-dimensional array of pixel values further includes using a shape-adaptive discrete wavelet transform to produce the corresponding one-dimensional array of temporal wavelet coefficients.

23. The computer-readable medium as recited in claim 21, wherein wavelet transforming each of the two-dimensional coefficient arrays further includes using a shape-adaptive discrete wavelet transform to produce the corresponding three-dimensional wavelet coefficients associated with the sequence of video frames.

24. The computer-readable medium as recited in claim 21, wherein wavelet transforming the one-dimensional array of pixel values further includes:

selectively associating pixel values with a pixel thread that runs in a temporal direction associated with the sequence of video frames;

aligning spatially corresponding pixel values in the temporal direction; and identifying each pixel value as either a continuing pixel, an emerging pixel, a terminating pixel, or a colliding pixel within the pixel thread, or otherwise an isolated pixel.

25. The computer-readable medium as recited in claim 24, wherein selectively associating pixel values with the pixel thread includes estimating a motion of at least one pixel with respect to the sequence of video frames.

26. The computer-readable medium as recited in claim 25, wherein the one-dimensional array of pixel values includes at least one pixel thread that logically extends through at least two sequential video frames.

27. The computer-readable medium as recited in claim 24, wherein wavelet transforming the one-dimensional array of pixel values further includes:

determining a boundary for an arbitrarily shaped object image within at least a portion of the sequence of video frames, the boundary having at least one pixel value therein; and wavelet transforming each of the pixel values within an arbitrarily shaped object image.

28. The computer-readable medium as recited in claim 21, wherein arranging the temporal wavelet coefficients within the plurality of two-dimensional coefficient arrays further includes:

maintaining spatial alignment information for each pixel value; and redistributing the resulting temporal wavelet coefficients to corresponding spatial positions in each video frame.

29. The computer-readable medium as recited in claim 24, wherein wavelet transforming the one-dimensional array of pixel values further includes:

applying a lowpass filter to the pixel values to produce a corresponding lowpass thread having lowpass coefficients; and applying a highpass filter to the pixel values to produce a corresponding highpass thread having highpass coefficients.

30. The computer-readable medium as recited in claim 29, wherein wavelet transforming the one-dimensional array of pixel values further includes:

applying a lowpass filter to lowpass coefficients.

31. The computer-readable medium as recited in claim 29, wherein wavelet transforming the one-dimensional array of pixel values further includes:

sampling even frames in the lowpass thread to obtain the lowpass coefficients; and sampling odd frames in the highpass thread to obtain the highpass coefficients.

32. The computer-readable medium as recited in claim 27, wherein wavelet transforming the one-dimensional array of pixel values further includes:

identifying video frames as either even frames or odd frames;

determining a motion vector for each isolated pixel within the object; and if a given isolated pixel is in an even frame, scaling the temporal wavelet coefficient related to the given isolated pixel by the square root of two (sqrt(2)).

33. The computer-readable medium as recited in claim 27, wherein wavelet transforming the one-dimensional array of pixel values further includes:

identifying video frames as either even frames or odd frames;

determining a motion vector for each isolated pixel within the object;

if a given isolated pixel is in an odd frame and the motion vector for the given isolated pixel points to a pixel position in a previous even frame that is not within the object, scaling the wavelet coefficient related to the given isolated pixel by the square root of two (sqrt(2)); and assigning the scaled wavelet coefficient to the spatial pixel position pointed to by the motion vector.

34. The computer-readable medium as recited in claim 27, wherein wavelet transforming the one-dimensional array of pixel values further includes:

identifying video frames as either even frames or odd frames;

determining a motion vector for each isolated pixel within the object;

if a given pixel is in an odd frame and the motion vector for the given isolated pixel points to a pixel position in a previous even frame that is within the object, scaling the wavelet coefficient related to the given isolated pixel by $sqrt(2)/2(P_{is}-P_{pre})$, where $P_{is}$ is the temporal wavelet coefficient of the given isolated pixel and $P_{pre}$ is the wavelet coefficient of the pixel pointed to by the motion vector; and assigning the scaled wavelet coefficient to the pixel position pointed to by the motion vector.

35. The computer-readable medium as recited in claim 27, wherein wavelet transforming the one-dimensional array of pixel values further includes:

identifying video frames as either even frames or odd frames;

determining a motion vector for each isolated pixel within the object;

determining a motion vector for each isolated pixel within the object, wherein each object is positioned within a bounding box; and if a given pixel is in an even frame and the motion vector for the given isolated pixel points to a pixel position in a previous even frame that is outside of the bounding box, assigning the pixels in each layer a wavelet coefficient having a constant value, $P_{con}$, and scaling the wavelet coefficient for the given isolated pixel by $sqrt(2)/2(P_{is}-P_{con})$.

36. The computer-readable medium as recited in claim 21, further comprising:

scaling the three-dimensional wavelet coefficients associated with the sequence of video frames.

37. The computer-readable medium as recited in claim 21, further comprising computer-executable instructions for:

encoding the three-dimensional wavelet coefficients associated with the sequence of video frames.

38. The computer-readable medium as recited in claim 21, further comprising computer-executable instructions for:

storing the three-dimensional wavelet coefficients associated with the sequence of video frames.

39. The computer-readable medium as recited in claim 21, further comprising computer-executable instructions for:

transmitting the three-dimensional wavelet coefficients associated with the sequence of video frames.

40. The computer-readable medium as recited in claim 21, further comprising computer-executable instructions for:

selectively rendering the sequence of video frames using the three-dimensional wavelet coefficients.

41. An arrangement comprising logic configured to wavelet transform a one-dimensional array of pixel values selected from a sequence of video frames to produce a corresponding one-dimensional array of temporal wavelet coefficients, arrange the resulting temporal wavelet coefficients within a plurality of two-dimensional coefficient arrays in positions that substantially correspond to a spatial arrangement of the pixel values within the sequence of video frames, and wavelet transform each of the two-dimensional coefficient arrays to produce corresponding three-dimensional wavelet coefficients associated with the sequence of video frames.

42. The arrangement as recited in claim 41, wherein the logic uses a shape-adaptive discrete wavelet transform to produce the corresponding one-dimensional array of temporal wavelet coefficients.

43. The arrangement as recited in claim 41, wherein the logic uses a shape-adaptive discrete wavelet transform to produce the corresponding three-dimensional wavelet coefficients associated with the sequence of video frames.

44. The arrangement as recited in claim 41, wherein the logic is further configured to selectively associate pixel values with a pixel thread that runs in a temporal direction associated with the sequence of video frames, align spatially corresponding pixel values in the temporal direction, and identify each pixel value as either a continuing pixel, an emerging pixel, a terminating pixel, or a colliding pixel within the pixel thread, or otherwise an isolated pixel.

45. The arrangement as recited in claim 44, wherein the logic is further configured to estimate a motion vector of at least one pixel with respect to the sequence of video frames.

46. The arrangement as recited in claim 45, wherein the one-dimensional array of pixel values includes at least one pixel thread that logically extends through at least two sequential video frames.

47. The arrangement as recited in claim 44, wherein the logic is further configured to determine a boundary for an arbitrarily shaped object image within at least a portion of the sequence of video frames, the boundary having at least one pixel value therein, and wavelet transform each of the pixel values within an arbitrarily shaped object image.

48. The arrangement as recited in claim 41, wherein the logic is further configured to maintain spatial alignment information for each pixel value and redistribute the resulting temporal wavelet coefficients to corresponding spatial positions in each video frame.

49. The arrangement as recited in claim 44, wherein the logic is further configured to apply a lowpass filter to the pixel values to produce a corresponding lowpass thread having lowpass coefficients, and a highpass filter to the pixel values to produce a corresponding highpass thread having highpass coefficients.

50. The arrangement as recited in claim 49, wherein the logic is further configured to apply a lowpass filter to lowpass coefficients.

51. The arrangement as recited in claim 49, wherein the logic is further configured to sample even frames in the lowpass thread to obtain the lowpass coefficients and odd frames in the highpass thread to obtain the highpass coefficients.

52. The arrangement as recited in claim 47, wherein the logic is further configured to identify video frames as either even frames or odd frames, determine a motion vector for each isolated pixel within the object, and if a given isolated pixel is in an even frame, scale the temporal wavelet coefficient related to the given isolated pixel by the square root of two (sqrt(2)).

53. The arrangement as recited in claim 47, wherein the logic is further configured to identify video frames as either even frames or odd frames, determine a motion vector for each isolated pixel within the object, if a given isolated pixel is in an odd frame and the motion vector for the given isolated pixel points to a pixel position in a previous even frame that is not within the object, scale the wavelet coefficient related to the given isolated pixel by the square root of two (sqrt(2)), and assign the scaled wavelet coefficient to the spatial pixel position pointed to by the motion vector.

54. The arrangement as recited in claim 47, wherein the logic is further configured to identify video frames as either even frames or odd frames, determine a motion vector for each isolated pixel within the object, if a given pixel is in an odd frame and the motion vector for the given isolated pixel points to a pixel position in a previous even frame that is within the object, scale the wavelet coefficient related to the given isolated pixel by $sqrt(2)/2(P_{is}-P_{pre})$, where $P_{is}$ is the temporal wavelet coefficient of the given isolated pixel and $P_{pre}$ is the wavelet coefficient of the pixel pointed to by the motion vector, and assign the scaled wavelet coefficient to the pixel position pointed to by the motion vector.

55. The arrangement as recited in claim 47, wherein the logic is further configured to identify video frames as either even frames or odd frames, determine a motion vector for each isolated pixel within the object, determine a motion vector for each isolated pixel within the object, wherein each object is positioned within a bounding box, if a given pixel is in an even frame and the motion vector for the given isolated pixel points to a pixel position in a previous even frame that is outside of the bounding box, assign the pixels in each layer a wavelet coefficient having a constant value, $P_{con}$, and scale the wavelet coefficient for the given isolated pixel by $sqrt(2)/2(P_{is}-P_{pre})$.

56. The arrangement as recited in claim 41, wherein the logic is further configured to scale the three-dimensional wavelet coefficients associated with the sequence of video frames.

57. The arrangement as recited in claim 41, wherein the logic is further configured to encode the three-dimensional wavelet coefficients associated with the sequence of video frames.

58. The arrangement as recited in claim 41, further comprising:
memory operatively coupled to the logic and configured to allow the logic to store the three-dimensional wavelet coefficients associated with the sequence of video frames.

59. The arrangement as recited in claim 41, further comprising:
an interface operatively coupled to the logic and configured to allow the logic to output the three-dimensional wavelet coefficients associated with the sequence of video frames.

60. The arrangement as recited in claim 41, further comprising:
rendering logic operatively coupled to receive the three-dimensional wavelet coefficients associated with the sequence of video frames from the logic and selectively render the sequence of video frames using the three-dimensional wavelet coefficients.

61. A method of processing a video signal that represents a video, the video including a plurality of frames organized in a temporal dimension, each frame including a two dimensional image, each image including an object, the method comprising:
determining a boundary for the object;
matching corresponding pixels within the boundary, each corresponding pixel being positioned in a different frame, and each pixel containing information that is embodied in the video signal; and
processing the video signal with a shape-adaptive, three-dimensional discrete wavelet transform.

* * * * *

UNITED STATES PATENT AND TRADEMARK OFFICE
CERTIFICATE OF CORRECTION

PATENT NO. : 6,597,739 B1  Page 1 of 1
DATED : July 22, 2003
INVENTOR(S) : Li et al.

It is certified that error appears in the above-identified patent and that said Letters Patent is hereby corrected as shown below:

Column 1,
Line 14, replace "modem" with -- modern --.

Column 2,
Line 26, replace "Wavelet" with -- wavelet --.

Column 5,
Line 30, insert -- a -- between "disk," and "removable".

Column 11,
Line 33, replace "apes" with -- types --.

Signed and Sealed this

Fourth Day of November, 2003

JAMES E. ROGAN
*Director of the United States Patent and Trademark Office*